US00RE38698E

(19) United States
(12) Reissued Patent
Joulia

(10) Patent Number: US RE38,698 E
(45) Date of Reissued Patent: Feb. 8, 2005

(54) ASSEMBLY FOR PACKAGING AND APPLYING A PRODUCT, ESPECIALLY A COSMETIC PRODUCT

(75) Inventor: Gerard Joulia, Paris (FR)

(73) Assignee: L'Oreal, Paris (FR)

(21) Appl. No.: 09/734,184

(22) Filed: Dec. 12, 2000

Related U.S. Patent Documents

Reissue of:
(64) Patent No.: 6,024,507
Issued: Feb. 15, 2000
Appl. No.: 09/206,394
Filed: Dec. 7, 1998

(30) Foreign Application Priority Data

Dec. 10, 1997 (FR) ..... 97 15632

(51) Int. Cl.[7] ..... A45D 40/00
(52) U.S. Cl. ..... 401/4; 401/126; 401/129; 401/130; 366/130
(58) Field of Search ..... 401/4, 130, 126, 401/129; 366/130, 309

(56) References Cited

U.S. PATENT DOCUMENTS 3,606,276 A * 9/1971 Jackson
4,886,080 A * 12/1989 Cole

FOREIGN PATENT DOCUMENTS

| | | | |
|---|---|---|---|
| DE | 89 14 067 | * | 2/1990 |
| FR | 2598299 | * | 11/1987 |
| GB | 1459859 | * | 12/1976 |
| JP | 4-10812 | | 1/1992 |
| JP | 4-22302 | | 1/1992 |
| JP | 9-94115 | | 4/1997 |
| WO | WO 90/04341 | * | 5/1990 |

* cited by examiner

*Primary Examiner*—David J. Walczak
(74) *Attorney, Agent, or Firm*—Oblon, Spivak, McClelland, Maier & Neustadt, P.C.

(57) ABSTRACT

An assembly (1) for packaging and applying a product, especially a cosmetic product, includes a reservoir (2) formed of a body (3) surmounted by a neck (12) having a free edge which delimits an opening (18) and a cap element (17) capable of removably capping the opening (18). The cap element (17) forms a member by which to grasp an applicator (22), secured to a first end (21) of a connecting member (20) whose second end (19) is secured to the cap element (17). When the cap element (17) is in the closed position, the applicator (22) lies inside the reservoir (2) so that it can withdraw some of the product. The neck (12) is of axis Y, distinct from the axis X of the body, and mounted so that it is free to rotate with respect to the said body (3).

19 Claims, 3 Drawing Sheets

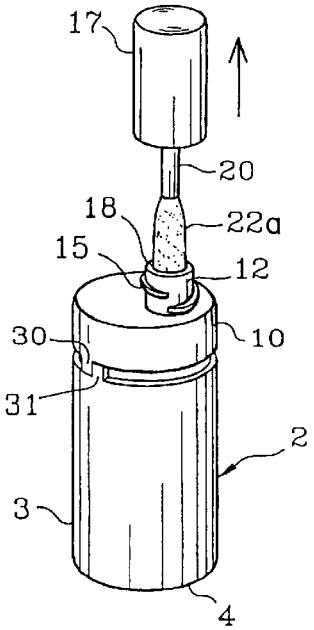
NEW FIG. 2E
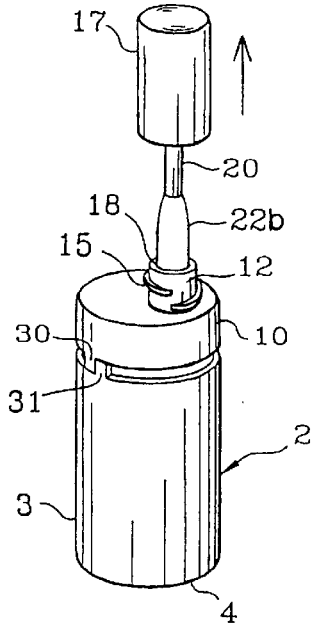
NEW FIG. 2F

ASSEMBLY FOR PACKAGING AND APPLYING A PRODUCT, ESPECIALLY A COSMETIC PRODUCT

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to an assembly for packaging and applying a product. The invention is most particularly suited to the packaging and application of products of relatively high viscosity, such as those typically used in the field of cosmetics. By way of non-limiting example, such products may be mascaras, foundations, styling gels, eye shadows, lip colors, etc.

2. Description of the Related Art

Traditionally, such products are packaged in a reservoir formed of a body of having a longitudinal axis surmounted by a neck, a free edge of which delimits an opening that is located along the axis of the reservoir. A removable cap element provides a closure for the opening. The cap element also forms a member for grasping an applicator which is secured by its first end to a connecting member, the second end of the connecting member being secured to the cap element. When the cap element is in the closed position, the applicator lies inside the reservoir so as to be in contact with the product.

One of the problems encountered with this type of packaging is, for example, that a significant amount of product remains stuck to the interior walls of the reservoir due to the relatively high viscosity of these products. The applicator, which is centered within the reservoir, cannot withdraw product that is stuck to the interior wall of the reservoir. This results in a substantial amount of product that the consumer cannot use. This of course is unsatisfactory. Furthermore, in some cases, prior to application, it may be desirable, or even necessary, for the packaged product to be agitated in order to homogenize it. Particularly in the case of relatively viscous formulae, such homogenization cannot be obtained simply by shaking the device, even if the device is shaken extremely well.

A certain number of solutions have been proposed for solving these problems. Among these, mention may be made of the solution described in EP-A-325,766. According to this document, the interior walls of the reservoir are scraped using a component in the form of a propeller blade which is turned as the lid which caps the device, is screwed and unscrewed. Among the drawbacks which are inherent to such devices, are the complexity, weakness and cost of such devices.

SUMMARY OF THE INVENTION

Accordingly, one of the objects of the invention is to provide an assembly for packaging and applying a product, especially a cosmetic product, and which fully or partly solves the problems discussed earlier with reference to the conventional devices.

In particular, one object of the invention is to provide a simple, robust, easy to use, and effective solution to the problems of residue sticking to the interior walls of the reservoir and/or of homogenizing the packaged product.

According to the invention, these objects are achieved by producing an assembly for packaging and applying a product, especially a cosmetic product, which includes a reservoir formed of a body of with a longitudinal axis surmounted by a neck having a free edge which delimits an opening. The assembly also includes a cap element configured to removably close the opening, the wherein cap element is shaped approximately for grasping. An applicator is secured to a first end of a connecting member whose second end is secured to the cap element such that when the cap element is in the closed position, the applicator lies inside the reservoir so that it can be loaded with some of the product. The neck has a longitudinal axis, offset from the axis of the body, and is mounted so that it is free to rotate with respect to the said body.

Thus, by turing the neck of the reservoir with respect to the body, the applicator is revolved inside the reservoir along a radius substantially equal to the distance (eccentricity) between the two axes. Through an appropriate choice of the distance between the two axes, it is possible either to cause the applicator to wipe the interior walls of the reservoir or simply to cause the contents of the reservoir to be stirred, or both. Operation is simple and the cost of the assembly is not appreciably increased because the applicator is made to serve both (i) as the withdrawing and applicator member and (ii) as the member for scraping the walls and/or for homogenizing the packaged product.

Advantageously, the neck is secured to a mounting ring which is free to rotate on an opening formed by a free edge of the body of the reservoir. Such a mounting ring may comprise means capable wiping or wringing out the applicator when the applicator is extracted from the reservoir, mounted about the longitudinal axis of the neck, inside the reservoir.

Advantageously, the mounting ring has reliefs, or striations, capable of making the ring easier to rotate with respect to the body. Such striations may be obtained during molding of the ring. Preferably, the neck is mounted on the body by snap-fitting. Appropriate sealing means, of the seal or sealing skirt type, may be used to make the assembly more leaktight.

According to a preferred embodiment, the assembly according to the invention comprises means forming an angular stop, placed between the neck and the body so as to allow the neck to be rotated in both directions with respect to the body over only a given angular range of motion. Such means may comprise a narrow tooth, provided by the ring, and capable of engaging with a corresponding tooth provided by the body of the reservoir close to its opening. Such an embodiment makes the action of using the assembly easier, by allowing the neck to be turned with respect to the body of the reservoir which mixes the product and scrapes the inner walls of the reservoir and allowing the device to be opened or closed in one and the same action. In fact, the two actions are can be performed partially simultaneously with each other. Advantageously, the stop forming means are placed in such a way as to allow the neck to be rotated in both directions with respect to the body over a predetermined angular range of about 360°.

Preferably, the cap element and the neck portion are configured such that when the cap element is screwed onto the neck, the cap element can be turned in a first direction, or "unscrewing direction," with a view to unscrewing such that the neck portion turns with respect to the body over the predetermined angular range, then once the neck has come into contact with its stop with respect to the body, further turning causes the cap element to unscrew and disengage from the neck. Turning the cap element in a second direction, or "screwing direction," opposite to the first, with a view to screwing the cap element on, causes the cap element to be screwed onto the neck and causes the neck to turn with respect to the body over the angular range until the neck comes into abutment with respect to the body.

According to one possible embodiment, the axis of the neck is placed with respect to the axis of the body in such a way that a radially outer portion of the applicator is close to, or even substantially in contact with, the interior walls of the body of the reservoir.

The applicator may consist of a spatula, a brush with axial or radial bristles, a block of foam, or a felt tip. Such members may or may not be flocked, depending on the desired application characteristics.

The product may be a cosmetic product, especially a mascara, a foundation, an eye shadow, a styling gel or a lip color.

BRIEF DESCRIPTION OF THE DRAWINGS

Apart from the provisions described above, the invention also consists of a certain number of other provisions which will be explained below with reference to the non-limiting embodiments described with reference to the accompanying drawings, of which.

DETAILED DESCRIPTION OF THE PREFERRED EMBODIMENTS

Figure 1A:
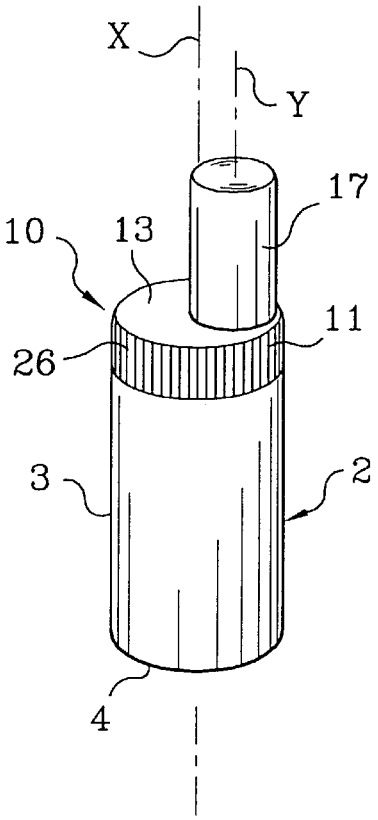
FIGS. 1A–1C illustrate a first embodiment of the packaging and application assembly according to the invention.
Figure 1B:
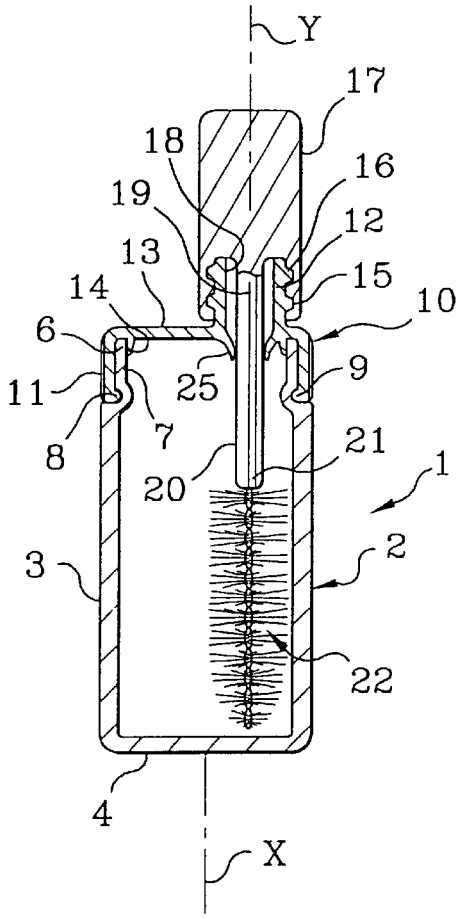
Figure 1C:
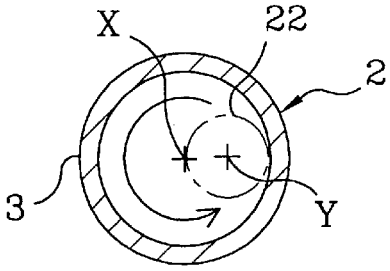

In the embodiment illustrated in FIGS. 1A–1C, the packaging and application assembly 1 comprises a reservoir 2 consisting of a body 3 which is cylindrical along a longitudinal of axis X. A first end of the body is closed by an end wall 4. The second end of the body 3 forms a free edge 6 defining an opening 7. The open end of the body 3 in recessed slightly radially inward with respect to the rest of the body and has a groove 8 capable of accommodating a snap-fitting bead 9 formed on the interior surface of the free edge of a ring 10. The ring 10 has a lateral portion 11, the outside diameter of which is substantially equal to the outside diameter of the body 3. Ring 10 includes a neck 12 connected to the lateral part 11 by a transverse shoulder 13. When the mounting ring 10 is in the mounted position, the axis Y of the neck 12 is offset from the axi X of the reservoir 2. In this mounted position, the mounting ring 10 is axially immobile with respect to the body 2 but free to rotate with respect to the latter. Thus, the neck 12 can revolve along a circle or a portion of a circle centered about the axis X of the reservoir 2.

A sealing stud 14 ensures that the ring 10 is mounted on the reservoir 2 so as to be leaktight. The exterior surface of the neck 12 has a screw thread 15 capable of interacting with a corresponding thread 16 formed on an interior surface of a cap 17 thereby allowing the opening and closing of opening 18 delimited by the neck 12. The cap is secured to the first end 19 of a wand 20 located substantially along the axis Y of the neck. The second end 21 of the wand 20 is secured to one end of an applicator 22, such as a radial-bristle brush of the type used for applying mascara to eyelashes. The applicator 22 is substantially in extension of the wand 20. The other end of the applicator 22 is free and lies substantially near the end wall 4 of the reservoir 2.

Mounting ring 10 includes a lip 25 formed around axis Y of neck 12 which forms a member which can be used to wipe or "wring out" the applicator 22 and possibly wipe wand 20. Lip 25 may be formed during molding of ring 10, for example, by the two-shot injection-molding of two physico-chemically compatible materials.

In order to use the packaging and application assembly according to the invention, the user turns the mounting ring 10 with respect to the body 3. For this purpose, striations 26 are formed on the exterior surface of the ring 10. Users can turn the mounting ring 10 through as many turns as they wish. However, in practice, one turn is usually sufficient. This turning of the mounting ring 10 with respect to the body 3 drives the wand 20 and the applicator inside the reservoir 2 in a revolutional movement about the axis X, the radius of the revolutional movement being substantially equal to the distance between the two axes X and Y. This revolutional movement allows the applicator to sweep almost all of the cross section of the reservoir, and also allows the product to be homogenized. Afterwards, still holding the ring 10 with one hand, the operator can unscrew the cap 17 with the other hand. Having completely unscrewed it, the operator can extract the applicator 22, which is wrung out as it passes across the lip 25. Like with the conventional devices, the cap 17 acts as the member via which the applicator is grasped. The user then applies the product in the conventional way. After application, the user returns the applicator to the reservoir through the opening 18 and screws the cap 17 back on with one hand while still holding the mounting ring 10 in the other hand.

With cap 17 mounted in the opening 18 of the neck 12, offset with respect to the axis X of the reservoir 2, the lateral edge of the applicator lies more or less in contact with the interior walls of the body 3. It is thus possible to remove any product which has stuck to the inner walls of body 3. As can be seen from the sectional view of FIG. 1C, turning the mounting ring 10 with respect to the body 3 allows the applicator to sweep almost all of the cross section of the reservoir 2, thus allowing substantially all of the product it contains to be used, regardless of the viscosity the product.

An alternative embodiment shown in FIGS. 2A–2D, makes it possible to simplify the operation of the assembly 1 as compared with the previous embodiment, while at the same time retaining the same characteristics with respect to the results and advantage achieved.

To this end, the free edge of the lateral part 11 of the mounting ring 10 includes a stop 30 (in the form of a tab facing towards the end wall 4 of the reservoir), capable of engaging a corresponding stop 31 (in the form of a tab pointing away from the end wall 4 of the reservoir) provided on the free edge of the body 3 of the reservoir 2. In the same manner as in the previous embodiment, the mounting ring 10 is held on the body 3 of the reservoir 2 by snap-fitting. The two stops are fairly narrow (of the order of 3 to 5 mm wide) so as to allow the ring to be turned with respect to the body 3 through approximately 360°. According to this embodiment, the applicator 22 consists of a tapering block of foam, such as may be used for applying a lip color or an eye shadow. The device according to this alternative form is in all other respects, similar to the previous embodiment.

Figure 2A:
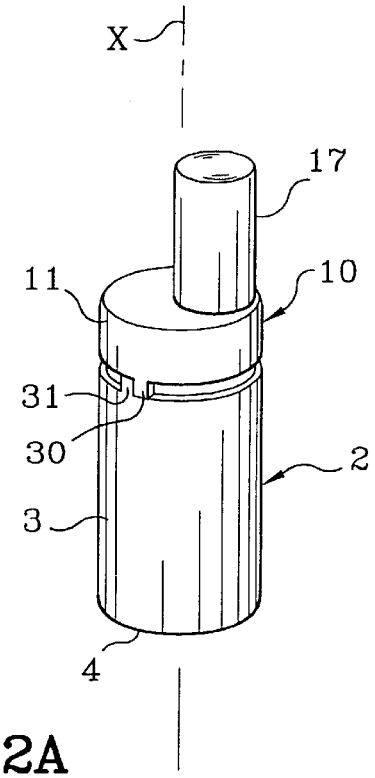
FIGS. 2A–[2D] *2F* illustrate [an] alternative [form] *forms* of the first embodiment of the packaging and application assembly according to the invention.
Figure 2B:
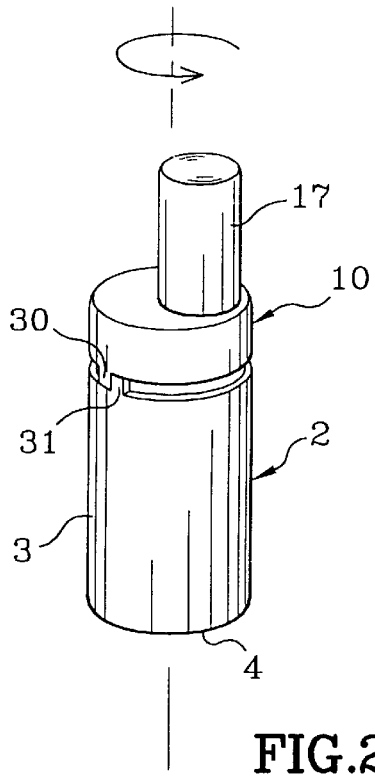
Figure 2C:
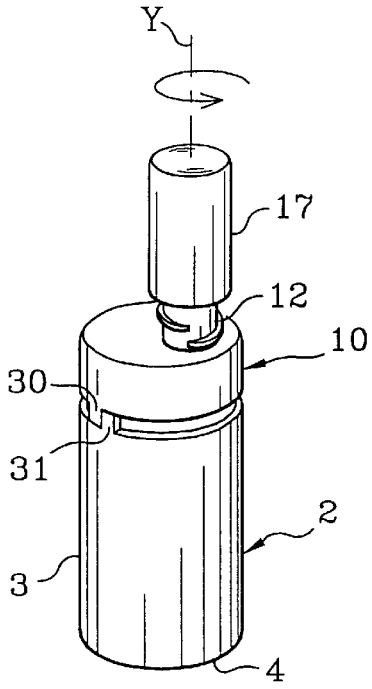

To use the assembly in accordance with this embodiment, the user holds cap 17 (as depicted in the position illustrated in FIG. 2A) and turns it with respect to the body 3 of the reservoir. The torque needed to unscrew the cap exceeds the torque needed to turn the ring 10 with respect to the body 3. Thus, the user first turns the ring 10 with respect to the body 3 until stop 30 comes into engagement with stop 31 (on a first side of the stop 31. FIG. 2B). The turning movement of the ring 10 with respect to the body also revolves the applicator inside the reservoir about the axis X, which produces the action of homogenizing the product and/or scraping the inner walls of the reservoir 2. At this moment, the torque applied to cap 17 causes the cap to unscrew (FIG. 2C). After complete unscrewing, the user extracts the applicator 22 from the reservoir (FIG. 2D), whereby the applicator is wrung out as it passes across the lip 25. After use, the user returns the applicator to the reservoir and screws the cap 17 onto the neck 12. In so doing, ring 10 is caused to turn with respect to the body 3 in the opposite direction to the first rotation. Once the stop 30 is engaged with the stop 31 (on the other side of the stop 31. FIG. 2A), the user can complete the screwing operation and seal the opening 18. Thus, with this embodiment, the action of the applicator (for scraping the walls and/or homogenizing the product) and opening the reservoir with a view to extracting the applicator can be at least partially simultaneously performed through one and the same action.

Figure 2D:
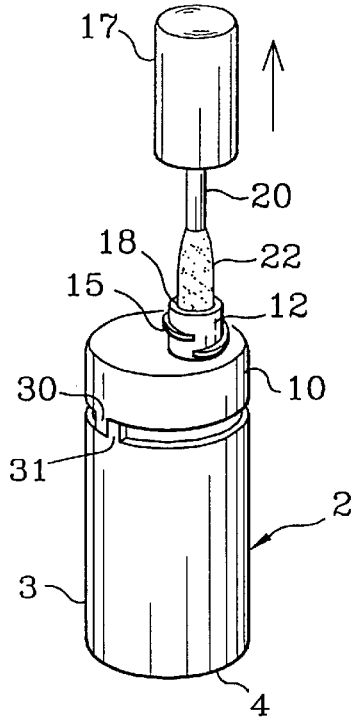

*FIG. 2E is similar to FIG. 2D but shows a felt tip applicator 22a. FIG. 2F is similar to FIG. 2D but shows a spatula applicator 22b.*

In the foregoing detailed description, reference has been made to certain preferred embodiments of the invention. It is obvious that variants are possible without departing from the spirit of the invention as claimed below.

What is claimed as new and desired to be secured by Letters Patent of the United States is:

1. An assembly for packaging and applying a product, especially a cosmetic product, comprising:

a body defining a reservoir *with a closed bottom*, said body having a first longitudinal axis;

a neck provided on said body, said neck *having* a free edge which defines an opening of said neck, said neck having a longitudinal axis distinct from said first axis of the body, [said neck rotatably mounted to said body;] *and being formed by a mounting ring rotatably mounted on said body, said mounting ring being attached to said body at a position closer to said opening than it is to said closed bottom*; and a cap element configured to removably close said opening of said neck, said cap element including an applicator.

2. A packaging and application assembly according to claim 1, wherein said cap element comprises a member by which to grasp said applicator, secured to a first end of a connecting member whose second end is secured to said applicator.

3. A packaging and application assembly according to claim 1, wherein said applicator is arranged such that when said cap element is in the closed position, said applicator lies inside the reservoir and in contact with a portion of said product.

[4. A packaging and application assembly according to claim 1, wherein said neck comprises a mounting ring which is free to rotate on an opening formed by a free edge of the body of the reservoir.]

5. A packaging and application assembly according to claim [4] *1*, wherein said mounting ring comprises, means for wringing out the applicator when the applicator is extracted from the reservoir, provided about said longitudinal axis of said neck.

6. A packaging and application assembly according to claim [4] *1*, wherein said mounting ring includes reliefs configured to make said ring easier to rotate with respect to the body.

7. A packaging and application assembly according to claim 5, wherein said mounting ring includes reliefs configured to make said ring easier to rotate with respect to the body.

8. A packaging and application assembly according to claim [4] *1*, wherein said mounting ring includes reliefs provided on a radially outer surface of said mounting ring.

9. A packaging and application assembly according to claim 1, wherein the said neck is snap-fitted on said body.

10. A packaging and application assembly according to claim 2, wherein the said neck is snap-fitted on said body.

11. A packaging and application assembly according to claim 3, wherein the said neck to snap-fitted on said body.

12. A packaging and application assembly according to claim [4] *1*, wherein the said mounting ring is snap-fitted on said body.

13. A packaging and application assembly according to claim 9, further comprising a rotational stop placed between said neck and said body, said rotational stop configured to limit the rotational movement *of* the neck with respect to the body, to a predetermined angular range.

14. A packaging assembly according to claim 13, wherein said predetermined angular range is approximately 360°.

15. A packaging and application assembly according to claim 13, wherein said cap element and said neck are configured such that when said the cap element is rotated in an unscrewing direction, said neck is caused to rotate with respect to the body over said predetermined angular range until said neck contacts said stop, then said cap element is caused to unscrew from said neck; and wherein said cap element and said neck are configured such that when said cap element is rotated in an screwing direction, opposite to the unscrewing direction, said cap element is caused to be screwed onto the neck and said neck is caused to turn with respect to the body over said predetermined angular range until said neck contacts said stop.

16. A packaging and application assembly according to claim 15, wherein said cap and said neck are configured such that a torque needed to unscrew said cap exceeds a torque needed to turn said mounting ring with respect to said body.

17. A packaging and application assembly according to claim 1, wherein said longitudinal axis of said neck is spaced from said longitudinal axis of said body such that said applicator is proximate to [the] interior walls of the body of the reservoir.

18. A packaging and application assembly according to claim 1, wherein said longitudinal axis of said neck is spaced from said longitudinal axis of said body such that said applicator is substantially in contact with [the] interior walls of the body of the reservoir.

19. A packaging and applications assembly according to claim 1, wherein said applicator comprises at least one of a spatula, a brush with axial or radial bristles, a block of foam, or a felt tip.

20. A packaging and application assembly according to claim 1, wherein said product, comprises at least one of a mascara, a foundation, an eyeshadow, a styling gel and a lip color.

* * * * *

UNITED STATES PATENT AND TRADEMARK OFFICE

CERTIFICATE OF CORRECTION

PATENT NO. : RE 38,698 E
DATED : February 8, 2005
INVENTOR(S) : Gerard Joulia

It is certified that error appears in the above-identified patent and that said Letters Patent is hereby corrected as shown below:

Column 6,
Line 17, change “to” to -- is --.

Signed and Sealed this

Twenty-first Day of June, 2005

JON W. DUDAS
*Director of the United States Patent and Trademark Office*